United States Patent
Sugihira

(10) Patent No.: US 11,491,972 B2
(45) Date of Patent: Nov. 8, 2022

(54) AUTOMATIC PARKING CONTROL DEVICE

(71) Applicant: TOYOTA JIDOSHA KABUSHIKI KAISHA, Toyota (JP)

(72) Inventor: Shigehiro Sugihira, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 145 days.

(21) Appl. No.: 17/172,562

(22) Filed: Feb. 10, 2021

(65) Prior Publication Data
US 2021/0284136 A1 Sep. 16, 2021

(30) Foreign Application Priority Data

Mar. 13, 2020 (JP) .............................. JP2020-044380

(51) Int. Cl.
*B60W 30/06* (2006.01)
*B60W 10/06* (2006.01)
*B60W 10/18* (2012.01)

(52) U.S. Cl.
CPC ............ *B60W 30/06* (2013.01); *B60W 10/06* (2013.01); *B60W 10/18* (2013.01); *B60W 2510/0638* (2013.01); *B60W 2510/0676* (2013.01); *B60W 2510/18* (2013.01); *B60W 2710/0661* (2013.01); *B60W 2710/18* (2013.01)

(58) Field of Classification Search
CPC ...... B60W 10/06; B60W 10/18; B60W 30/06; B60W 2510/0638; B60W 2510/0676; B60W 2510/18; B60W 2710/0661; B60W 2710/18
See application file for complete search history.

(56) References Cited

U.S. PATENT DOCUMENTS

| | | | | |
|---|---|---|---|---|
| 5,666,917 A | * | 9/1997 | Fraser | F02D 41/083 180/69.3 |
| 11,180,136 B2 | * | 11/2021 | Sadakiyo | B60W 30/06 |
| 2002/0103055 A1 | * | 8/2002 | Tani | F02N 11/0844 477/115 |
| 2018/0072284 A1 | * | 3/2018 | Bales | B60T 8/1708 |
| 2019/0031188 A1 | | 1/2019 | Yamashita | |

FOREIGN PATENT DOCUMENTS

JP 2019-025994 A 2/2019

* cited by examiner

*Primary Examiner* — Edwin A Young
(74) *Attorney, Agent, or Firm* — Finnegan, Henderson, Farabow, Garrett & Dunner LLP

(57) ABSTRACT

An automatic parking control device is configured to: execute a rotation prediction process to calculate a predicted idle speed change portion by advancing an actual idle speed change portion by a brake response delay time; execute a driving force prediction process to calculate a predicted driving force change portion according to the predicted idle speed change portion; execute a braking force control process to calculate a change portion of a target vehicle braking force that cancels the predicted driving force change portion and instruct it to a brake device; and, when the brake response delay time is longer than an engine response delay time, execute a rotational speed control delay process to delay a target idle speed change by a rotational speed control delay time being longer than or equal to a difference obtained by subtracting the engine response delay time from the brake response delay time.

11 Claims, 9 Drawing Sheets

AUTOMATIC PARKING CONTROL DEVICE

CROSS-REFERENCE TO RELATED APPLICATION

The present disclosure claims priority under 35 U.S.C. § 119 to Japanese Patent Application No. 2020-044380, filed on Mar. 13, 2020. The content of which is incorporated herein by reference in its entirety.

BACKGROUND

Technical Field

The present disclosure relates to an automatic parking control device configured to automatically move a vehicle.

Background Art

JP 2019-025994 A discloses an automatic parking control device mounted on a vehicle equipped with: a drive device including an internal combustion engine and a torque converter and configured to output a vehicle driving force transmitted to wheels of the vehicle; and a brake device configured to generate a vehicle braking force applied to the wheels. This automatic parking control device automatically moves the vehicle to a target parking position by performing creep running with idle operation of an internal combustion engine. However, in order to move the vehicle to the target parking position with high accuracy, it is necessary to drive the vehicle at a lower speed than that during the creep running. Therefore, in order to realize this kind of vehicle running at a very low speed, the automatic parking control device combines the vehicle braking force with the vehicle driving force generated during the idle operation.

SUMMARY

When the idle speed changes during execution of the automatic parking control at a very low speed using the creep running, the vehicle driving force also changes accordingly. There is a concern that, if this kind of change in the vehicle driving force cannot be properly cancelled by the adjustment of the vehicle braking force, a shock due to acceleration or deceleration may occur in the vehicle, and the occupant may feel discomfort with the behavior of the vehicle during the automatic parking control.

JP 2019-025994 A discloses a technique for actively adjusting the braking force change (increase/decrease) timing so as to alleviate the feeling of discomfort of the occupant while allowing the braking force change timing to deviate from the driving force change timing due to the change in the idle speed. In other words, JP 2019-025994 A discloses measures that can alleviate the feeling of discomfort of the occupant while avoiding predicting the driving force change timing and the braking force change timing.

However, in order to alleviate the feeling of discomfort of the occupant as described above and reduce a decrease in parking position accuracy, it is necessary to appropriately obtain a change portion of the target vehicle braking force for properly canceling the change portion of the actual vehicle driving force according to a change portion of the actual idle speed due to a change in the target idle speed. For that purpose, it is favorable to be able to properly predict the idle speed change portion that is the basis for calculating the change portion of the target vehicle braking force.

Then, the automatic parking control with the prediction of the idle speed change portion as described above is required to be achieved regardless of whether the response delay time on the brake device side (i.e., the brake response delay time) or the response delay time of the actual idle speed change on the internal combustion engine side (i.e., the engine response delay time) is longer.

Moreover, in order to alleviate the feeling of discomfort of the occupant and reduce a decrease in parking position accuracy, it is required to improve the accuracy of prediction by a rotation prediction process of predicting the idle speed change portion described above.

The present disclosure has been made in view of the problem described above. The first object of the present disclosure is to achieve an automatic parking control with prediction of an idle speed change portion regardless of whether the brake response delay time or the engine response delay time is longer. Also, the second object is to improve the accuracy of prediction in an automatic parking control with a rotation prediction process of predicting an idle speed change portion that is the basis for calculating a change portion of target vehicle braking force for canceling a change in vehicle driving force.

An automatic parking control device according to a first aspect of the present disclosure is applied to a vehicle that is equipped with a drive device and a brake device and that is configured to execute an automatic parking control that automatically moves the vehicle to a target parking position. The drive device includes an internal combustion engine and a torque converter and is configured to output a vehicle driving force transmitted to a wheel of the vehicle. The brake device is configured to generate a vehicle braking force applied to the wheel. The automatic parking control includes a driving force change cancellation control that controls the brake device so as to generate the vehicle braking force that cancels a change in the vehicle driving force associated with a change in actual idle speed of the internal combustion engine when a target idle speed changes in response to an idle speed change request. The automatic parking control device includes an electronic control unit configured, in the driving force change cancellation control, to: execute a rotation prediction process to calculate a predicted idle speed change portion corresponding to a change portion of an idle speed obtained by advancing a change portion of the actual idle speed associated with a change in the target idle speed by a brake response delay time from a time point at which a target vehicle braking force is instructed to the brake device to a time point at which a change in the vehicle braking force starts; execute a driving force prediction process to calculate a predicted driving force change portion corresponding to a change portion of the vehicle driving force according to the predicted idle speed change portion; execute a braking force control process to calculate, as a change portion of the target vehicle braking force, a change portion of the vehicle braking force that cancels the predicted driving force change portion and instruct a calculated vehicle braking force change portion to the brake device; and, when the brake response delay time is longer than an engine response delay time being a response delay time of the actual idle speed with respect to the change in the target idle speed, execute a rotational speed control delay process to delay the change in the target idle speed, by a rotational speed control delay time, from a time point at which the idle speed change request is issued. The rotational speed control delay time is longer than or equal to a difference obtained by subtracting the engine response delay time from the brake response delay time.

The rotation prediction process may include at least one of a predicted rotational speed delay process, a rate limiting process, and a first-order delay process to calculate a waveform of the predicted idle speed change portion based on a waveform of the target idle speed. The predicted rotational speed delay process may delay a change start time point of the waveform of the predicted idle speed change portion so as to be delayed from a change start time point of the waveform of the target idle speed by a predicted rotational speed delay time corresponding to a difference obtained by subtracting the brake response delay time from the engine response delay time. The rate limiting process may delay a slope of the waveform of the predicted idle speed change portion so as to be equal to or smaller than a maximum slope of the change in the actual idle speed that can be generated by the internal combustion engine. The first-order delay process may be applied to a waveform of the target idle speed without any of the predicted rotational speed delay process and the rate limiting process, or a waveform of the predicted idle speed change portion after at least one of the predicted rotational speed delay process and the rate limiting process.

An automatic parking control device according to a second aspect of the present disclosure is applied to a vehicle that is equipped with a drive device and a brake device and that is configured to execute an automatic parking control that automatically moves the vehicle to a target parking position. The drive device includes an internal combustion engine and a torque converter and is configured to output a vehicle driving force transmitted to a wheel of the vehicle. The brake device is configured to generate a vehicle braking force applied to the wheel. The automatic parking control includes a driving force change cancellation control that controls the brake device so as to generate the vehicle braking force that cancels a change in the vehicle driving force associated with a change in actual idle speed of the internal combustion engine when a target idle speed changes in response to an idle speed change request. The automatic parking control device includes an electronic control unit configured, in the driving force change cancellation control, to: execute a rotation prediction process to calculate a predicted idle speed change portion corresponding to a change portion of an idle speed obtained by advancing a change portion of the actual idle speed associated with a change in the target idle speed by a brake response delay time from a time point at which a target vehicle braking force is instructed to the brake device to a time point at which a change in the vehicle braking force starts; execute a driving force prediction process to calculate a predicted driving force change portion corresponding to a change portion of the vehicle driving force according to the predicted idle speed change portion; and execute a braking force control process to calculate, as a change portion of the target vehicle braking force, a change portion of the vehicle braking force that cancels the predicted driving force change portion and instruct a calculated vehicle braking force change portion to the brake device. The rotation prediction process includes at least one of a predicted rotational speed delay process, a rate limiting process, and a first-order delay process to calculate a waveform of the predicted idle speed change portion based on a waveform of the target idle speed. The predicted rotational speed delay process delays a change start time point of the waveform of the predicted idle speed change portion so as to be delayed from a change start time point of the waveform of the target idle speed by a predicted rotational speed delay time corresponding to a difference obtained by subtracting the brake response delay time from an engine response delay time being a response delay time of the actual idle speed with respect to the change in the target idle speed. The rate limiting process delays a slope of the waveform of the predicted idle speed change portion so as to be equal to or smaller than a maximum slope of the change in the actual idle speed that can be generated by the internal combustion engine. The first-order delay process is applied to a waveform of the target idle speed without any of the predicted rotational speed delay process and the rate limiting process, or a waveform of the predicted idle speed change portion after at least one of the predicted rotational speed delay process and the rate limiting process.

The rotation prediction process may include all of the predicted rotational speed delay process, the rate limiting process, and the first-order delay process.

The rotation prediction process may include an interpolation process to calculate a final predicted idle speed change portion by interpolation for each time step based on the predicted idle speed change portion after at least one of the predicted rotational speed delay process, the rate limiting process, and the first-order delay process, and the change portion of the actual idle speed associated with the change in the target idle speed.

The predicted rotational speed delay time may be longer when cooling water temperature of the internal combustion engine is lower.

The slope of the waveform of the predicted idle speed change portion after being limited by the rate limiting process may be smaller when cooling water temperature of the internal combustion engine is lower.

According to the automatic parking control device according to the first aspect of the present disclosure, when the brake response delay time is longer than the engine response delay time, the rotational speed control delay process is performed in which the change in the target idle speed is delayed, by the rotational speed control delay time longer than or equal to the difference obtained by subtracting the engine response delay time from the brake response delay time, from the time point at which the idle speed change request is issued. As a result, even when the brake response delay time is longer than the engine response delay time, it becomes possible to perform the automatic parking control (driving force change cancellation control) with the prediction (calculation) of the predicted idle speed change portion. Thus, the automatic parking control device according to the first aspect makes is possible to achieve the automatic parking control with the prediction of the idle speed change portion (calculation of the predicted idle speed) regardless of whether the brake response delay time or the engine response delay time is longer.

According to the automatic parking control device according to the second aspect of the present disclosure, the calculation of the predicted idle speed change portion by the rotation prediction process is performed with at least one of the predicted rotational speed delay process, the rate limiting process, and the first-order delay process. As a result, it becomes possible to suitably increase the accuracy of the calculation (prediction) of the predicted idle speed change portion that is the basis of the calculation of the change portion of the target vehicle braking force for canceling the change in the vehicle driving force.

DETAILED DESCRIPTION

It is to be understood that even when the number, quantity, amount, range or other numerical attribute of an element is mentioned in the following embodiments, the present disclosure is not limited to the mentioned numerical attribute unless explicitly described otherwise, or unless the present disclosure is explicitly specified by the numerical attribute theoretically. Furthermore, structures, steps or the like that are described in conjunction with the following embodiments are not necessarily essential to the present disclosure unless explicitly shown otherwise, or unless the present disclosure is explicitly specified by the structures, steps or the like theoretically.

Embodiments according to the present disclosure will be described with reference to FIGS. 1 to 11.

1. Configuration Example of Automatic Parking System

Figure 1:
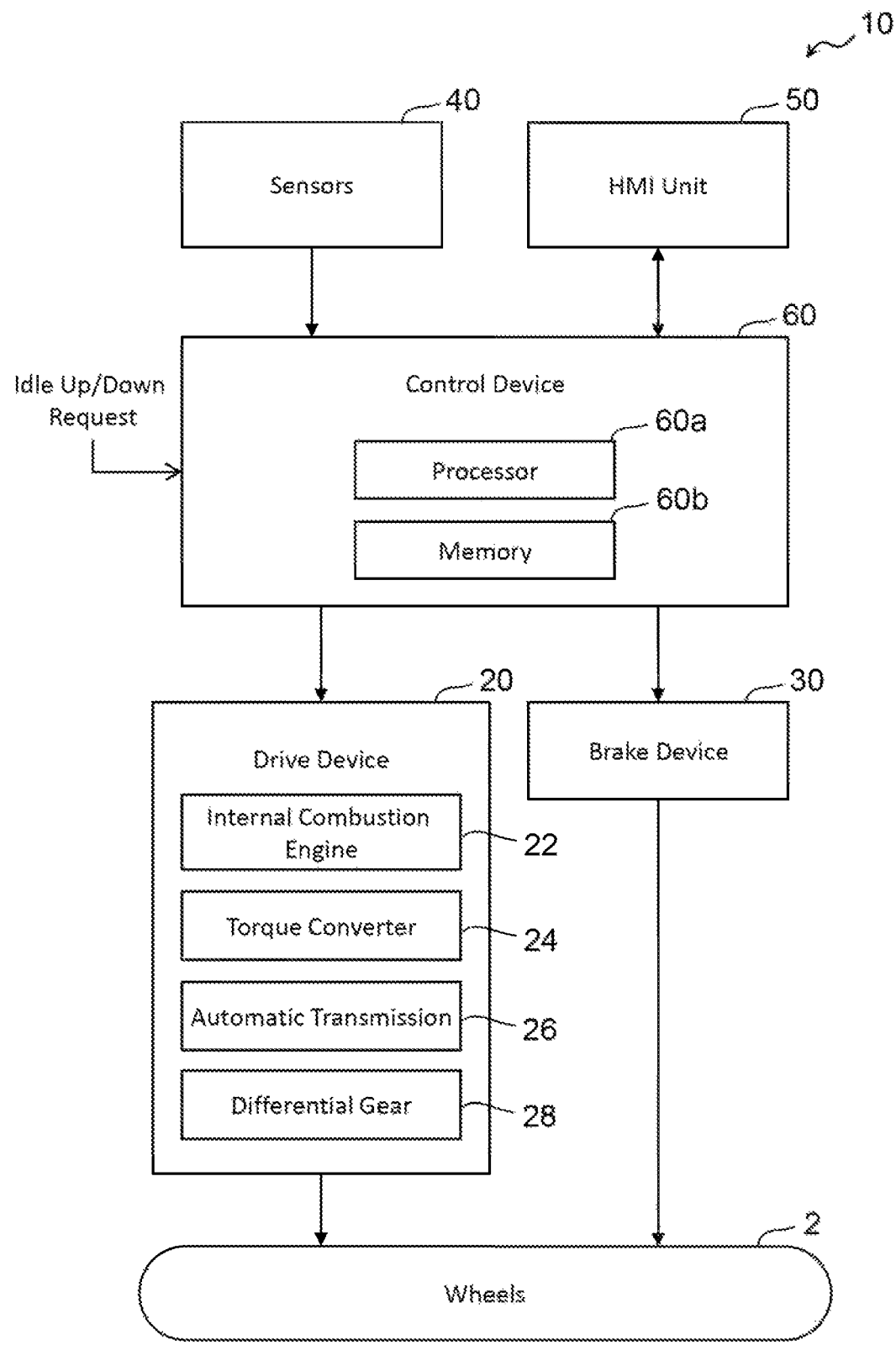
FIG. 1 is a block diagram showing a configuration example of an automatic parking system according to an embodiment of the present disclosure.
Figure 2:
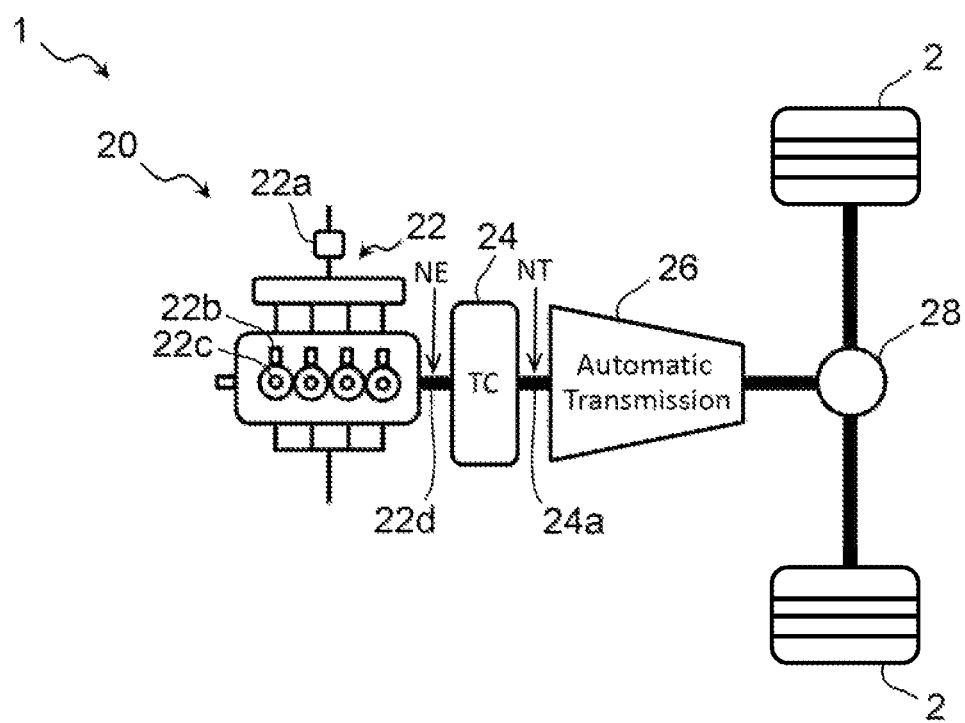
FIG. 2 is a schematic diagram showing an example of a configuration around a drive device of a vehicle equipped with the automatic parking system shown in FIG. 1.

FIG. 1 is a block diagram showing a configuration example of an automatic parking system 10 according to an embodiment. FIG. 2 is a schematic diagram showing an example of a configuration around a drive device 20 of a vehicle 1 equipped with the automatic parking system 10 shown in FIG. 1.

The automatic parking system 10 is mounted on the vehicle 1 and is provided with the drive device 20, a brake device 30, sensors 40, an HMI (Human Machine Interface) unit 50, and a control device 60. The control device 60 is configured to execute an "automatic parking control" for automatically moving the vehicle 1 to a target parking position, which corresponds to an example of the "automatic parking control device" according to the present disclosure.

The drive device 20 includes an internal combustion engine 22 configured to generate engine torque Te, and a torque converter (TC) 24 located between the internal combustion engine 22 and wheels (drive wheels) 2 of the vehicle 1. The drive device 20 further includes, for example, a stepped or continuously variable automatic transmission 26 and a differential gear 28. The drive device 20 is also referred to as a powertrain, and outputs a vehicle driving force (vehicle driving torque) Fd transmitted to the wheel 2. More specifically, the engine torque Te generated by the internal combustion engine 22 is transmitted to the wheels 2 via the torque converter 24, the automatic transmission 26, and the differential gear 28.

When the internal combustion engine 22 is idling (idle state), the internal combustion engine 22 generates idle torque depending on idle speed NEi. More specifically, the internal combustion engine 22 includes a throttle 22a, a fuel injection device (only fuel injection valves 22b are shown) and an ignition device (only ignition plugs 22c are shown) as actuators for controlling the engine torque Te. The idle torque generated is transmitted to the side of the automatic transmission 26 as creep torque (creep driving force) via the torque converter 24. The drive device 20 applies, to the wheels 2, the vehicle driving force Fd depending on this creep driving force and the respective gear ratios of the automatic transmission 26 and the differential gear 28. In the idle state, the vehicle 1 can perform creep running using this vehicle driving force Fd (hereinafter, also simply referred to as "driving force Fd"). When the idle speed NEi changes, the driving force Fd also changes accordingly.

The brake device 30 generates a vehicle braking force (vehicle braking torque) Fb applied to the wheels 2. This brake device 30 includes a master cylinder, a brake actuator and wheel cylinders, which are not shown. The wheel cylinders are provided on the respective wheels 2. The brake actuator supplies brake fluid output from the master cylinder to each wheel cylinder to generate a brake pressure (i.e., the braking force Fb). According to the brake device 30 having this kind of configuration, the braking force Fb can be controlled based on a command from the control device 60.

The sensors 40 are provided to detect information necessary for the automatic parking control. In detail, the sensors 40 include one or more external sensors for recognizing the situation around the vehicle 1. For example, the one or more external sensors include one or more cameras configured to image the surroundings of the vehicle 1. Based on the imaging information captured by the one or more cameras, a target parking position PT of the vehicle 1 in the automatic parking control can be recognized and the remaining distance X to the target parking position PT can also be calculated. Also, the one or more external sensors may include an ultrasonic sonar (clearance sonar) configured to detect an obstacle around the vehicle 1. By using the ultrasonic sonar, the remaining distance X to the target parking position PT can be calculated. Moreover, the sensors 40 may include a wheel speed sensor configured to detect the wheel rotation. Based on the detection result of the wheel speed sensor, the moving distance of the vehicle 1 can be calculated. Furthermore, the sensors 40 include: a crank angle sensor configured to detect the rotational speed (engine speed) NE of a crankshaft 22d of the internal combustion engine 22; a turbine rotational speed sensor configured to detect the rotational speed (turbine rotational speed) NT of an output shaft 24a of the torque converter 24; and an engine water temperature sensor configured to detect the engine cooling water temperature. The sensors 40 output the detected information to the control device 60.

The HMI unit 50 is an interface for providing various information to the operator of the vehicle 1 and receiving information from the operator. For example, the HMI unit 50 includes an input device, a display device, and a speaker. Examples of the input device include a touch panel, a keyboard, a switch, and a button. In particular, the input device includes an "automatic parking switch" for turning on/off the automatic parking function. The operator can use the input device to input information to the HMI unit 50. The HMI unit 50 sends information input from the operator to the control device 60.

The control device 60 is configured to execute the automatic parking control. The control device 60 is configured by an electronic control unit (ECU) and is a microcomputer including a processors 60a and a memory 60b. The control device 60 receives information from the sensors 40 and the HMI unit 50, and executes automatic parking control based on the received information.

The function of the control device 60 is realized by the processors 60a executing control programs stored in the memory 60b. The control programs may be stored on a computer readable recording medium. It should be noted that the control device 60 may be configured by a plurality of ECUs, such as an automatic parking ECU configured to mainly execute the automatic parking control, an engine ECU configured to control the operation of the internal combustion engine 22, and a brake ECU configured to control the brake device 2. Automatic Parking Control As described above, the control device 60 executes the "automatic parking control" for automatically moving the vehicle 1 to the target parking position PT. It should be noted that the automatic parking control includes at least steering control among the steering control and gear shift control, together with "vehicle speed control (i.e., driving force control and braking force control)". As will be described below, in the present embodiment, particular attention is paid to the "vehicle speed control". The steering control and the gear shift control are not particularly limited.

2-1. Basic Part of Automatic Parking Control

Figure 3:
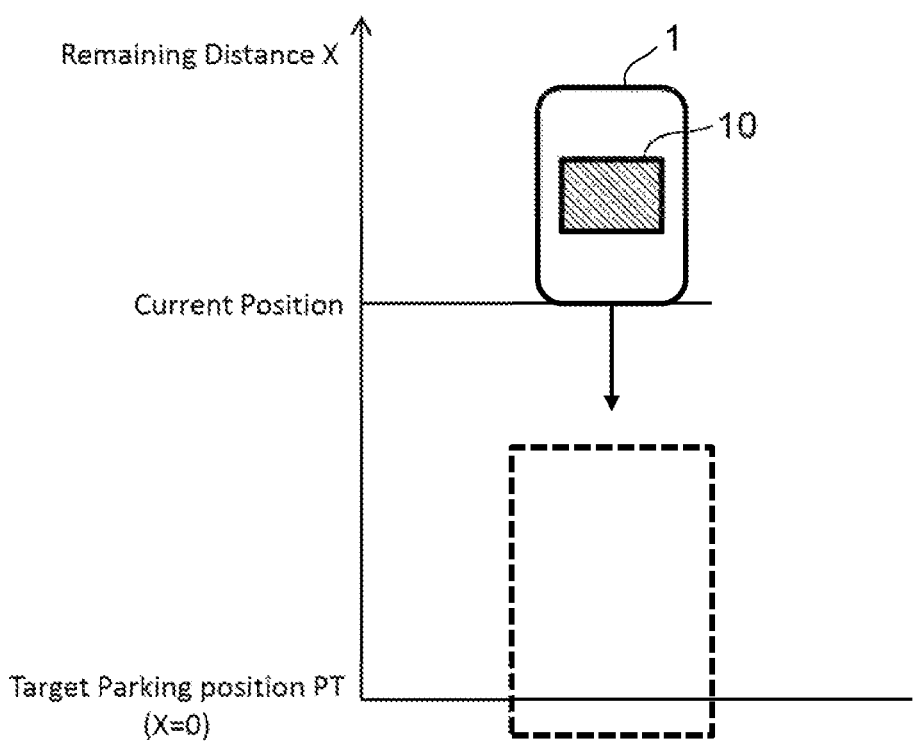
FIG. 3 is a conceptual diagram used to describe a basic part of an automatic parking control according to the embodiment of the present disclosure.

FIG. 3 is a conceptual diagram used to describe a basic part of the automatic parking control according to the embodiment. As already described, the vehicle 1 can perform creep running, and the control device 60 uses the creep running to automatically move the vehicle 1 to the target parking position PT. However, in order to move the vehicle 1 to the target parking position PT with high accuracy, it is necessary to drive the vehicle 1 at a lower speed than the creep running. Because of this, according to the vehicle speed control of the automatic parking control, the control device 60 controls the running of the vehicle 1 by controlling the braking force Fb while idling the internal combustion engine 22. That is, by combining the braking force Fb with the driving force Fd according to the idle speed NEi, very low speed vehicle running is realized.

Specifically, in the automatic parking control, the control device 60 first performs a "target position setting process" for setting the target parking position PT. This target position setting process is performed on the basis of the detection information received from the sensors 40.

Moreover, in the vehicle speed control, the control device 60 controls the driving force Fd by controlling the operation of the internal combustion engine 22. More specifically, the control device 60 stores a target idle speed NEit. When the control device 60 performs the idle operation as in time of the automatic parking control, the control device 60 performs an "idle speed control" for bringing the actual idle speed NEia closer to the target idle speed NEit, During execution of the automatic parking control, the drive device 20 generates a driving force Fd associated with the actual idle speed NEia that is controlled by the idle speed control.

Calculation of the driving force Fd associated with the actual idle speed NEia can be performed by, for example, using a relationship of the following Equation 1.

$$\text{Driving Force } Fd = NE^2 \times C(e) \times TR(e) \times GR \qquad (1)$$

The actual idle speed NEia is substituted for NE in Equation 1. C (e) and TR (e) in Equation 1 are respectively a volume coefficient and a torque ratio that represent the characteristics of the torque converter 24, and take values according to a speed ratio e(=rotational speed NT of the output shaft 24a/engine speed NE). The product $NE^2 * C$ (e) in Equation 1 corresponds to the input torque of the torque converter 24 (i.e., the engine torque Te). Torque ratio TR (e) is the ratio of the output torque of the torque converter 24 to the input torque thereof (engine torque Te). The GR in Equation 1 shows a gear ratio that comprehensively represents the gear ratios of each of the automatic transmission 26 and the differential gear 28. Therefore, according to Equation 1, the driving torque (driving force Fd) that is output from the driving device 20 and applied to the wheels 2 is calculated.

Regarding the calculation of the driving force Fd, the volume coefficient C (e) and the torque ratio TR (e) according to the speed ratio e can be calculated from, for example, a map (not shown) that defines a relationship between each of the volume coefficient C (e) and the torque ratio TR (e) and the speed ratio e. The engine speed NE (actual idle speed NEia) and the rotational speed NT of the output shaft 24a for the calculation of the speed ratio e can be calculated by, for example, using the crank angle sensor and the turbine rotational speed sensor, respectively. However, the rotational speed NT is very low during very low speed running in which the automatic parking control is performed. Because of this, the volume coefficient C (e) and the torque ratio TR (e) according to the speed ratio e may be calculated while simply treating the speed ratio e as zero.

Furthermore, the control device 60 calculates the remaining distance X (see FIG. 3) from the current position of the vehicle 1 to the target parking position PT, based on the detection information received from the sensors 40. For example, the target parking position PT can be recognized by performing image analysis of the imaging information captured by the camera, and the remaining distance X to the target parking position PT can be calculated. Alternatively, the remaining distance X can be calculated from the distance to the obstacle detected by the ultrasonic sonar (clearance sonar). Alternatively, based on the detection result of the wheel speed sensor, the moving distance of the vehicle 1 can be calculated and then the remaining distance X to the target parking position PT can be calculated.

To be more specific, the control device 60 performs the above described vehicle speed control based on the remaining distance X and the current driving force Fd. The target vehicle speed in the automatic parking control is expressed as a function of the remaining distance X. When the remaining distance X is zero, the target vehicle speed also becomes zero. Then, this target vehicle speed is very low speed lower than the creep running speed. This kind of very low speed is achieved by combining the braking force Fb to the driving force Fd (creep torque) associated with the actual idle speed NEia. Therefore, based on the current driving force Fd and the remaining distance X, the control device 60 calculates a target braking force (target vehicle braking force) Fbt necessary to obtain the target vehicle speed. Then, the control device 60 controls the operation of the brake device 30 such that the calculated target braking force Fbt is obtained. The vehicle 1 approaches the target parking position PT at a speed determined by the combination of the driving force Fd and the braking force Fb.

2-2. Drive Force Change Cancellation Control

During execution of the automatic parking control (vehicle speed control) at a very low speed using the creep running, the idle speed NEi may change. As a factor of the change of the idle speed NEi, for example, the load change of an auxiliary equipment of the internal combustion engine 22 (for example, compressor of air conditioner, or alternator) can be mentioned. Typically, when the air conditioner is in operation (i.e., air conditioner ON), an "idle up request" for increasing the idle speed NEi occurs, the control device 60 increases the target idle speed NEit in response to the idle up request. Then, with the idle speed control described above, the control device 60 controls the throttle 22a to increase the throttle opening degree and controls each fuel injection valves 22b to increase the fuel injection amount. Consequently, the actual idle speed NEia increases. On the other hand, when the air conditioner is stopped (i.e., air conditioner OFF), an "idle down request" for decreasing the idle NEi occurs. The control device 60 decreases the target idle speed NEit in response to the idle down request. Then, with the idle speed control, the control device 60 controls the throttle 22a to decrease the throttle opening degree and controls each fuel injection valve 22b to decrease the fuel injection amount. Consequently, the actual idle speed NEia decreases. Thus, the actual idle speed NEia is increased or decreased by the above described idle speed control so as to match the target idle speed NEit that changes in response to the idle up/down request.

When the actual idle speed NEia changes as described above during the execution of the automatic parking control using the creep running, the driving force Fd also changes accordingly. There is a concern that, if the driving force Fd that changes in this way cannot be properly canceled by the adjustment of the braking force Fb, a shock due to acceleration or deceleration may occur in the vehicle 1 and the occupant may feel discomfort with the behavior of the vehicle 1 during the automatic parking control. Also, there is a concern that the accuracy of the parking position by the automatic parking control may decrease.

2-2-1. Outline of Driving Force Change Cancellation Control (Basic Part)

The automatic parking control according to the present embodiment includes the following "driving force change cancellation control", That is, according to this driving force change cancellation control, when the target idle speed NEit changes in response to the idle up/down request (idle speed change request), the brake device 30 is controlled to generate a braking force Fb that cancels the change in the driving force Fd due to the change in the actual idle speed NEia.

Figure 4:
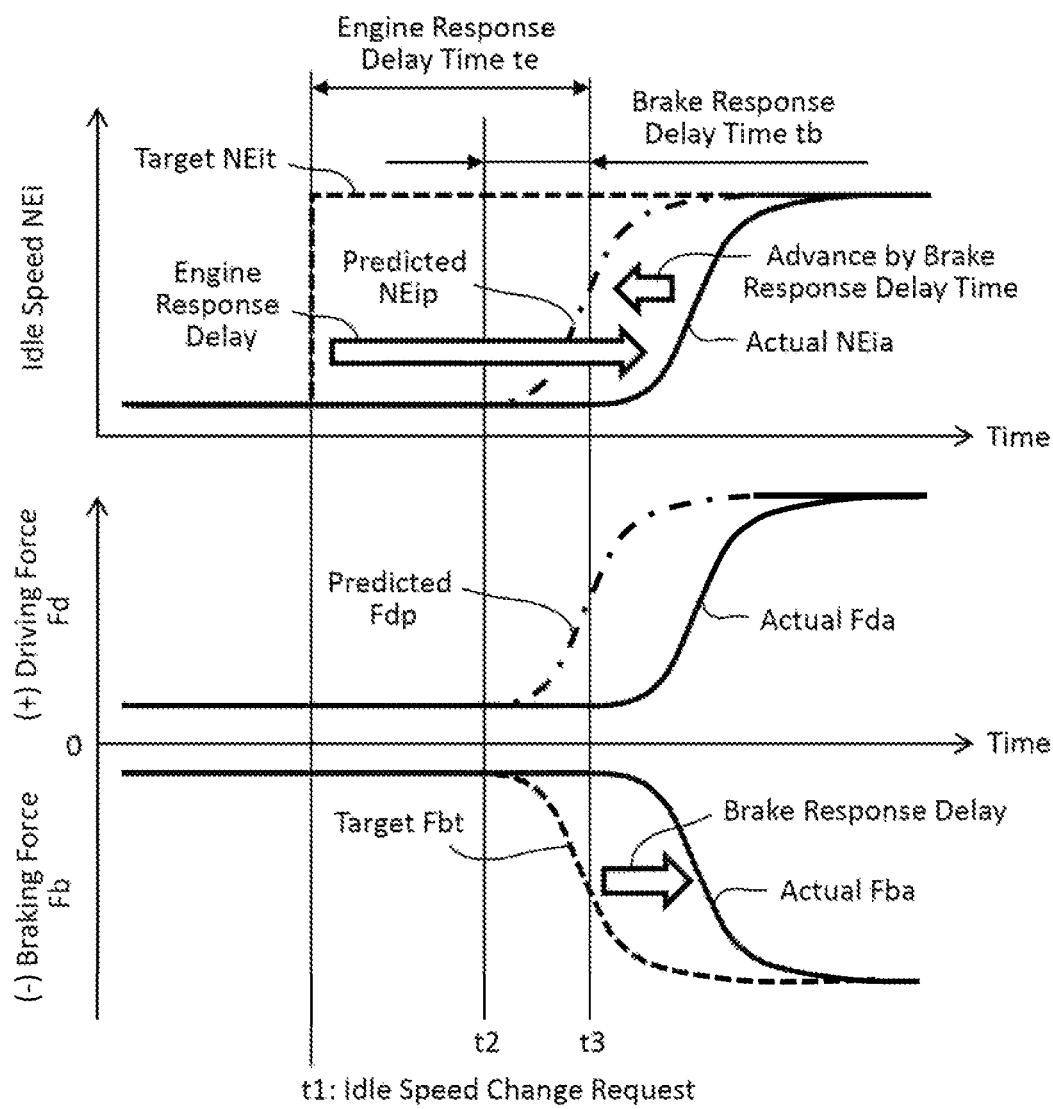
FIG. 4 is a time chart used to describe an outline of a driving force change cancellation control.

FIG. 4 is a time chart used to describe an outline of the driving force change cancellation control. In FIG. 4, each operation of the engine speed NE, the driving force Fd, and the braking force Fb at the time of the idle up request is shown as an example. It should be noted that the operation at the time of the idle down request is the same except that the positive and negative directions of changes in the respective waveforms of the engine speed NE, the driving force Fd, and the braking force Fb are opposite to those shown in FIG. 4, and thus the description thereof is omitted here. This also applies to FIGS. 5, 6A-6C, 9, and 10 described below.

There is a response delay in the change in the actual idle speed NEia with respect to the change in the target idle speed NEit. In the example shown in FIG. 4, when the target idle speed NEit starts to increase at a time point t1, the actual idle speed NEia starts to increase at a time point t3 that is delayed by an engine response delay time te from the time point t1. The response delay of actual value to a change of target value is present not only the internal combustion engine 22 side (drive device 20 side) but also on the brake device 30 side. A brake response delay time tb shown in FIG. 4 is the time from a time point at which the target braking force Fbt is instructed to the brake device 30 to a time point at which the braking force Fb (actual braking force Fba) starts to change.

In the driving force change cancellation control, the control device 60 executes a "rotation prediction process" in order to align the starting timing (In FIG. 4, time point t3) of the change in the driving force Fd (actual driving force Fda) associated with the change in the target idle speed NEit and the start timing of the change in the braking force Fb (actual braking force Fba) for canceling the change in the driving force Fd while considering the presence of the engine response delay time te and the brake response delay time tb.

The rotation prediction process is a process of calculating (predicting) a "change portion of predicted idle speed NEip". The change portion of the predicted idle speed NEip (for example, see one-dot chain line in FIG. 4) corresponds to an idle speed change portion obtained by advancing, by the brake response delay time tb, the change portion of the actual idle speed NEia associated with a change in the target idle speed NEiT. In the example shown in FIG. 4, a time point t2, which is advanced by the brake response delay time tb with respect to the change start time point 3 of the actual idle speed NEia, corresponds to the change start time point of the predicted idle speed NEip.

In the driving force change cancellation control, the control device 60 further executes a "driving force prediction process" and a "braking force control process".

The driving force prediction process is a process of calculating a change portion of a predicted driving force Fdp (for example, see one-dot chain line in FIG. 4), which is the change portion of the driving force Fd according to the change portion of the predicted idle speed NEip calculated by the rotation prediction process. That is, the driving force prediction process is a process of converting the change portion of the predicted idle speed NEip calculated by the rotation prediction process into the change portion of the driving force Fd. This conversion can be performed by, for example, substituting the predicted idle speed NEip into NE in Equation 1 described above.

The braking force control process is a process to calculate, as a change portion of the target braking force Fbt (for example, see broken line in FIG. 4), a change portion of the braking force Fb for canceling the calculated change portion of the predicted driving force Fdp, and then to instruct the calculated change portion of the target braking force fbt to the brake device 30. This change portion of the target braking force Fbt (i.e., the reaction force that cancels the change portion of the predicted driving force Fdp) is obtained by reversing the sign of the change portion of the predicted driving force Fdp, as shown in FIG. 4.

According to the driving force change cancellation control, the change portion of the target braking force Fbt calculated as described above is instructed to the brake device 30 at the time point t2 which is advanced by the brake response delay time tb with respect to the change start time point of the actual driving force Fda (in FIG. 4, the time point t3). As a result, the actual braking force Fba that cancels this change can be applied to the wheels 2 at the timing coincident with the start of the change in the actual driving force Fda.

Furthermore, in the rotation prediction process executed in the driving force change canceling control, as in the specific example described in detail below, the change portion of the predicted idle speed NEip is calculated while reproducing the shape of the waveform of the change portion of the actual idle speed NEia due to the change in the target idle speed NEiT as accurately (faithfully) as possible. This is to acquire the waveform of the change portion of the target braking force Fbt calculated on the basis of the change portion of the predicted idle speed NEip, as a waveform obtained by inverting the waveform of the change portion of the actual driving force Fda associated with the change portion of the actual idle speed NEia as accurately as possible. Then, if this kind of waveform of the change portion of the target braking force Fbt can be obtained, as shown in FIG. 4, the change portion of the actual braking force Fba that can accurately cancel the change portion of the actual driving force Fda can be applied to the wheels 2. This leads to alleviation of the feeling of discomfort of the occupant to the behavior of the vehicle and reduction of decrease of the parking position accuracy that are due to the inability to appropriately cancel the change portion of the actual driving force Fda due to the change in the actual idle speed NEia.

2-2-2. Issues on Driving Force Change Cancellation Control

In order to alleviate the feeling of discomfort of the occupant and reduce a decrease in the parking position accuracy due to the execution of the driving force change cancellation control, it is required to increase the accuracy of the prediction by the rotational prediction process of predicting the change portion of the idle speed (i.e., the change portion of the predicted idle speed NEip) which is the basis of the calculation of the change portion of the target braking force Fbt (first issue). It should be noted that this "first issue" corresponds to the "first object" according to the present disclosure.

Furthermore, the automatic parking control with the prediction of the change portion of the predicted idle speed NEip (more specifically, the driving force change cancellation control) is required to be achieved regardless of whether the brake response delay time tb or the response delay time (engine response delay time te) of the change in the actual idle speed NEia is longer (second issue). It should be noted that this "second issue" corresponds to the "second object" according to the present disclosure.

Figure 5:
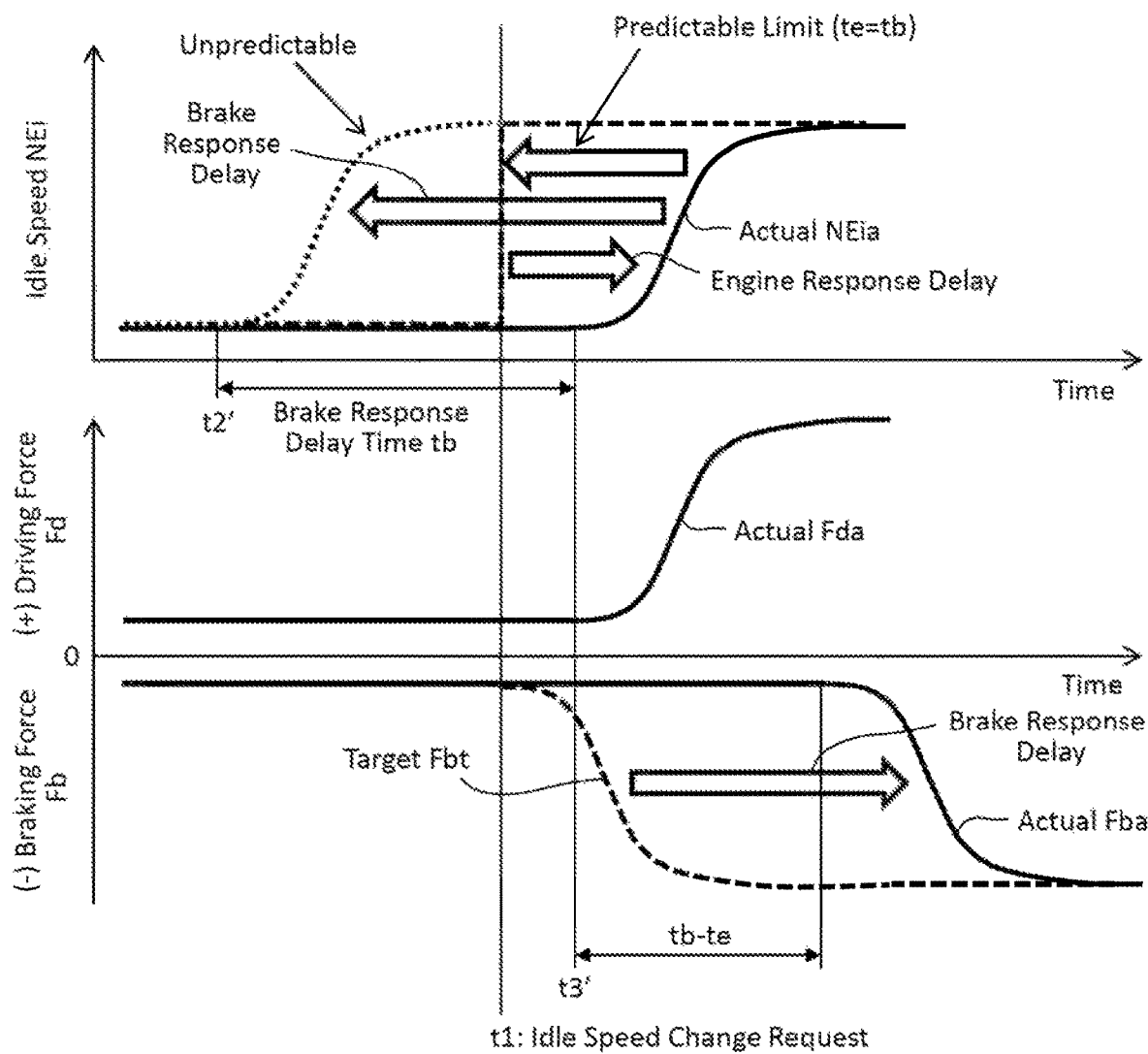
FIG. 5 is a time chart used to describe a second issue (an issue related to achieving the driving force change cancellation control regardless of whether a brake response delay time tb or an engine response delay time te is longer)

FIG. 5 is a time chart used to describe the second issue (an issue related to achieving the driving force change cancellation control regardless of whether the brake response delay time tb or the engine response delay time te is longer). If the engine response delay time te is longer than the brake response delay time tb as in the example shown in FIG. 4 described above, or if the engine response delay time te is the same as the brake response delay time tb, it is possible to predict the change portion of the predicted idle speed NEip that is advanced by the brake response delay time tb with respect to the change start time point of the actual idle speed NEia. Then, by applying the change portion of the actual braking force Fba based on this change portion of the predicted idle speed NEip to the wheels 2, the change portion of the actual driving force Fda can be cancelled.

On the other hand, FIG. 5 shows an example in which the brake response delay time tb is longer than the engine response delay time te. When the idle speed NEi starts to increase earlier by the brake response delay time tb with respect to a change start time point t3' of the actual idle speed NEia in this example, as shown in FIG. 5, a change start time point t2' of the change portion of the idle speed NEip to be predicted becomes earlier than the change start time point t1 of the target idle speed NEit. Therefore, the prediction cannot be performed. That is, the longest brake response delay time tb that can perform the prediction is obtained when the brake response delay time tb is the same as the engine response delay time te.

The inability to calculate the predicted idle speed NEip as described above means that it becomes impossible to instruct the change portion of the target braking force Fbt for canceling the change portion of the actual driving force Fda at the timing (in FIG. 5, time point 2') that is advanced by the brake response delay time tb with respect to the change start time point t3' of the actual idle speed NEia. Then, in the example in which the brake response delay time tb is longer than the engine response delay time te in this way, the timing at which the instruction for the change portion of the target braking force Fbt can be started earliest is the time point t1 as shown in FIG. 5. However, if the instruction is made at the time point t1, the start of applying the change portion of the actual braking force Fba is delayed, by the difference (=tb-te) between the brake response delay time tb and the engine response delay time te, with respect to the start of occurrence of the change portion of the actual driving force Fda (i.e., with respect to time point t3').

2-2-3. Specific Example of Rotation Prediction Process

As already described, the rotation prediction process is a process of calculating (predicting) the change portion of the predicted idle speed NEip that is obtained by advancing the change portion of the actual idle speed NEia due to the change in the target idle speed NEit by the brake response delay time tb. In view of the first issue described above, the "rotation prediction process" according to the present embodiment is executed as follows.

Figure 6A:
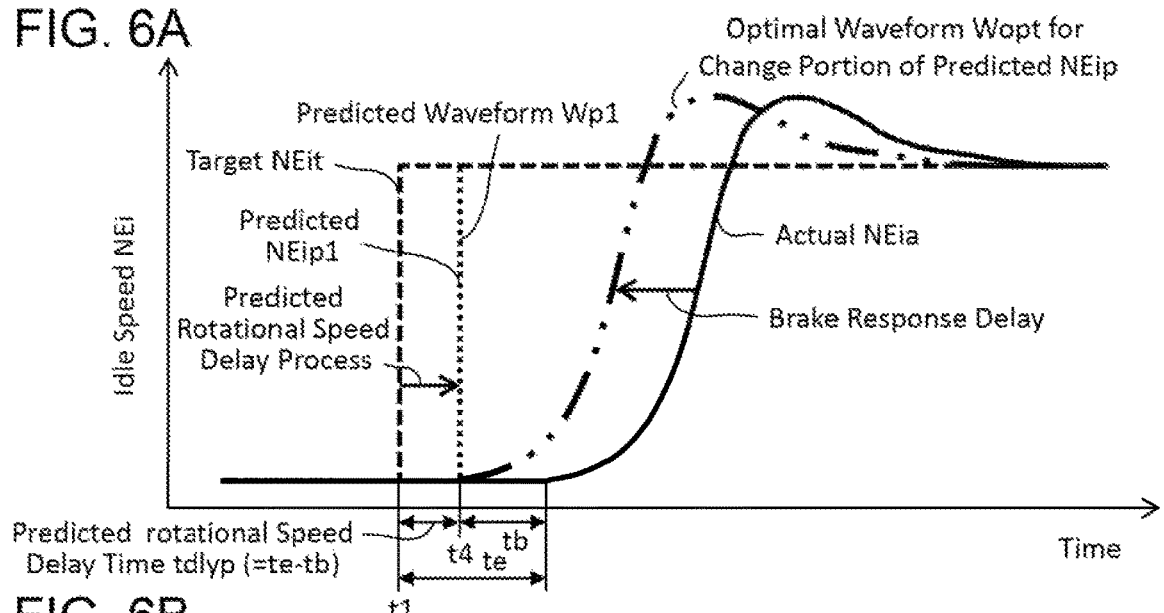
FIGS. 6A-6C are time charts used to describe each of a predicted rotational speed delay process, a rate limiting process, and a first order delay process included in a rotation prediction process according to the embodiment of the present disclosure.
Figure 6B:
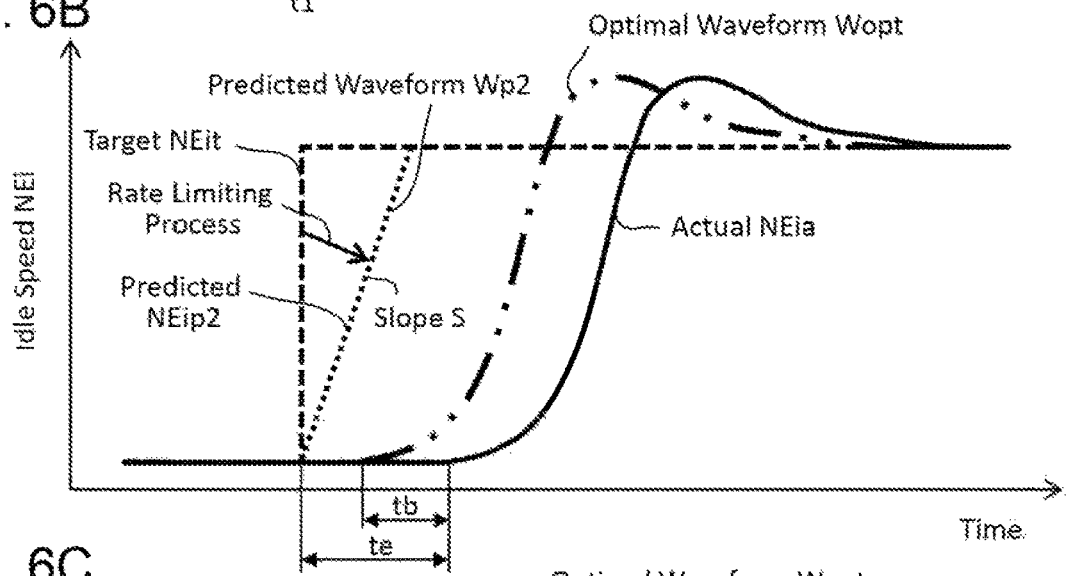
Figure 6C:
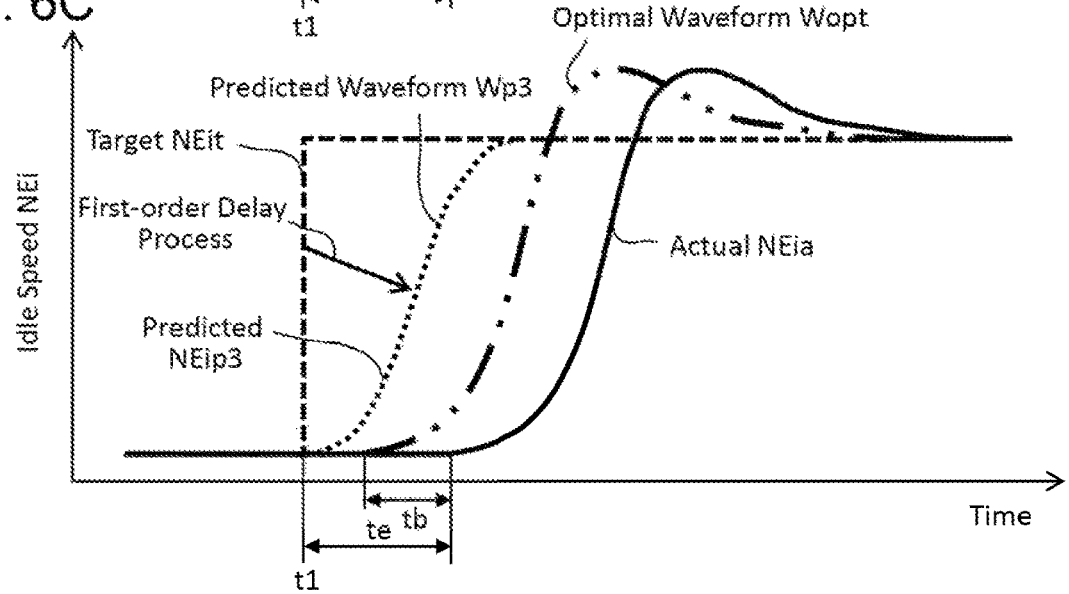

FIGS. 6A-6C are time charts used to describe each of a predicted rotational speed delay process, a rate limiting process, and a first order delay process included in the rotation prediction process according to the embodiment. Each of FIGS. 6A-6C shows an optimal waveform Wopt for the change portion of the predicted idle speed NEip. This optimal waveform Wopt corresponds to the waveform obtained by moving the waveform of the change portion of the actual idle speed NEia in parallel so as to advance by the brake response delay time tb without changing the shape of the waveform. That is, the optimal waveform Wopt is the best as a prediction result of the waveform (hereinafter, also simply referred to as "predicted waveform Wp") of the change portion of the predicted idle speed NEip by the rotation prediction process. Therefore, the higher the degree of coincidence of the predicted waveform Wp with respect to the optimal waveform Wopt, the more appropriately the change portion of the actual driving force Fda can be cancelled out by using the actual braking force Fba based on the calculated change portion of the predicted idle speed NEip.

Accordingly, in order to obtain the predicted waveform Wp as close as possible to the optimal waveform Wopt, the rotation prediction process includes the "predicted rotational speed delay process", the "rate limiting process", and the "first-order delay process" for calculating the predicted waveform Wp based on the waveform of the target idle speed NEiT.

The predicted rotational speed delay process, the rate limiting process, and the first-order delay process will be described individually in this order with reference to FIGS. 6A-6C. Each of these drawings represents the waveform of the change portion of the target idle speed NEit increased stepwise in response to an idle up request, as shown by the broken line.

(Predicted Rotational Speed Delay Process)

Figure 10:
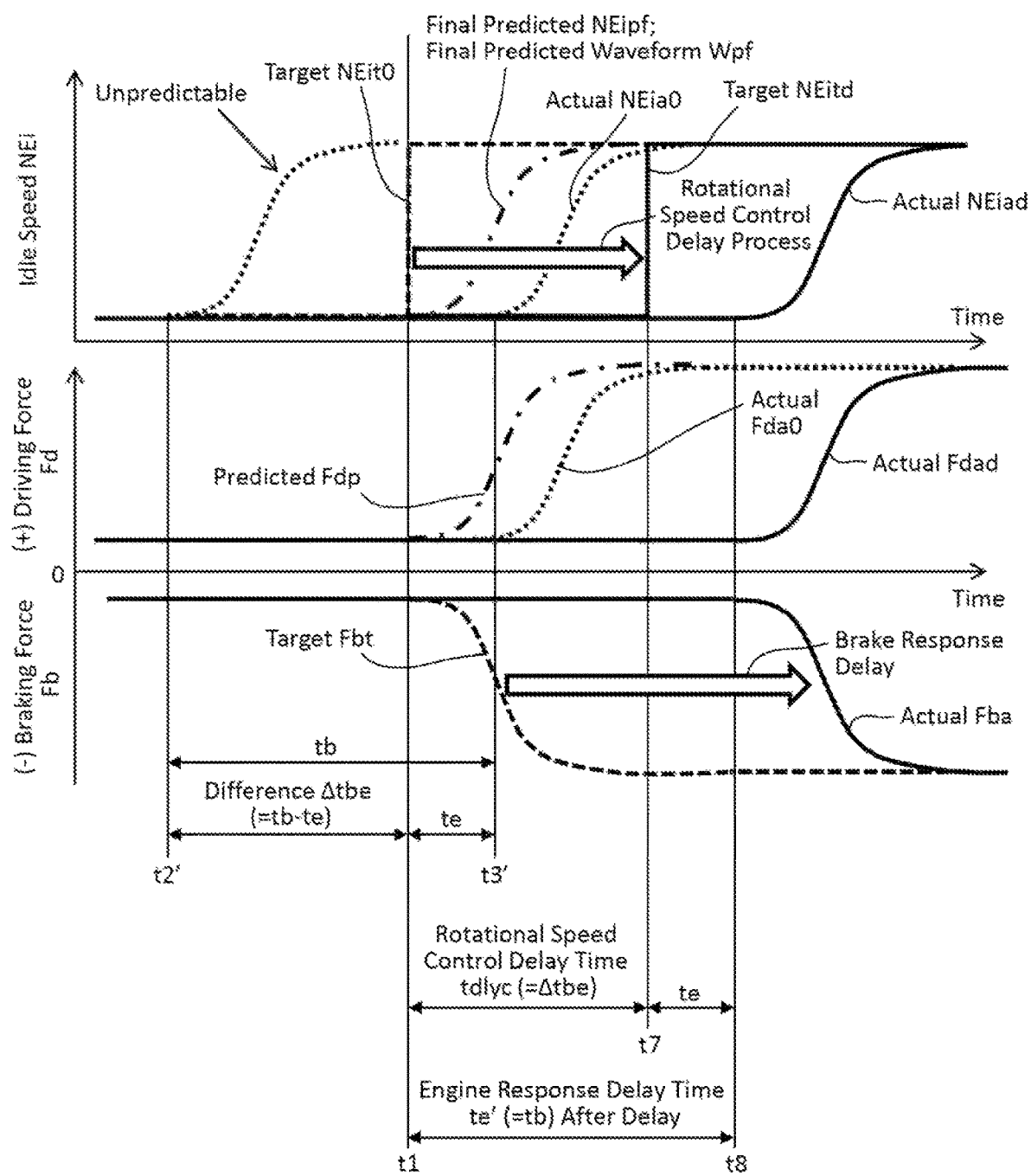
FIG. 10 is a time chart used to describe an outline of a rotational speed control delay process.

First, FIG. 6A represents a waveform (predicted waveform Wp1) of the change portion of a predicted idle speed NEip1 obtained by performing the predicted rotational speed delay process for the waveform of the target idle speed NEit. This predicted rotational speed delay process is a process of delaying the change start time point of the predicted waveform Wp1 such that a time point 14 that is delayed by a predicted rotational speed delay time tdlyp from the change start time point 11 of the waveform of the target idle speed NEit is obtained. The predicted rotational speed delay time tdlyp corresponds to the "difference obtained by subtracting the brake response delay time tb from the engine response delay time te" as shown in FIG. 6A. It should be noted that, as shown in FIG. 10 described below, the predicted rotational speed delay time tdlyp when the rotational speed control delay process is performed corresponds to a difference obtained by subtracting the brake response delay time tb from an "engine response delay time te' after the rotational speed control delay process."

Figure 7:
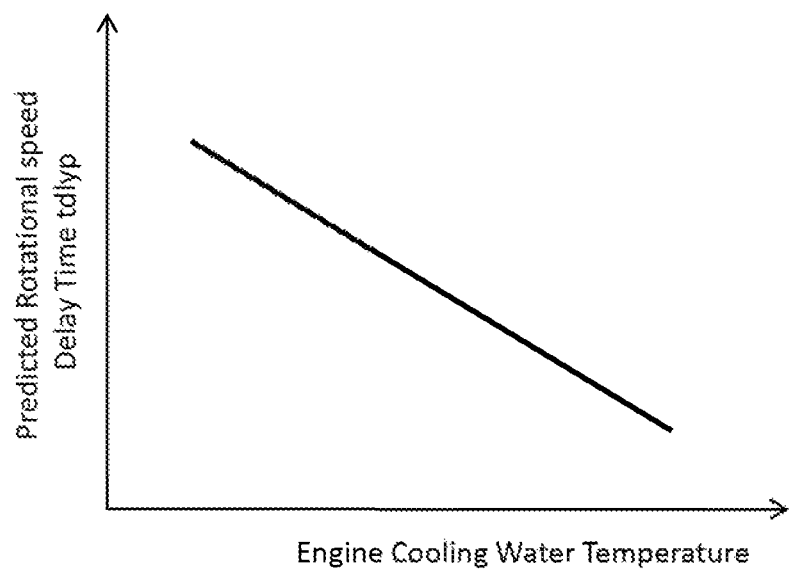
FIG. 7 is a graph showing a relationship between the engine response delay time te and engine cooling water temperature.

In addition, the predicted rotational speed delay process is performed to delay the change start time point of the predicted waveform Wp1 until the change start time point t4 of the optimal waveform Wopt of the change portion of the predicted idle speed NEip. The engine response delay time te and the brake response delay time tb used for calculating the predicted rotational speed delay time tdlyp can be obtained by, for example, conducting experiments in advance. Both of the delay times te and tb may be fixed values, but here, as an example, the delay times te and tb are calculated as follows. FIG. 7 is a graph showing a relationship between the engine response delay time te and the engine cooling water temperature. That is, the engine response delay time te changes depending on, for example, the engine cooling water temperature. More specifically, as shown in FIG. 7, the engine response delay time te becomes longer when the engine cooling water temperature is lower. Therefore, the control device 60 stores the relationship as shown in FIG. 7 as a map in the memory 60b, and calculates the engine response delay time te depending on the engine cooling water temperature from this kind of map. Then, for example, the difference between the engine response delay time te thus calculated and the brake response delay time tb, which is a fixed value, may be calculated as the predicted rotational speed delay time tdlyp. Moreover, the brake response delay time tb changes depending on, for example, the brake oil pressure and the brake oil temperature. Because of this, the brake response delay time tb used for calculating the predicted rotational speed delay time tdlyp may be changed according to at least one of the brake oil pressure and the brake oil temperature. Alternatively, for example, the predicted rotational speed delay time tdlyp may be calculated so as to be longer when the engine cooling water temperature is lower, from a map that defines the relationship between the predicted rotational speed delay time tdlyp itself and the engine cooling water temperature.

(Rate Limiting Process)

Next, FIG. 6B represents a waveform (predicted waveform Wp2) of the change portion of a predicted idle speed NEip2 obtained by performing the rate limiting process for the waveform of the target idle speed NEit. This rate limiting process is a process of limiting a slope S of the predicted waveform Wp2 so as to be equal to or smaller than the maximum slope of the change in the actual idle speed NEia that the internal combustion engine 22 can generate. As an example, the slope S of the predicted waveform Wp2 shown in FIG. 6B is limited so as to coincide with the above described maximum slope obtained by conducting, for example, experiments in advance.

Figure 8:
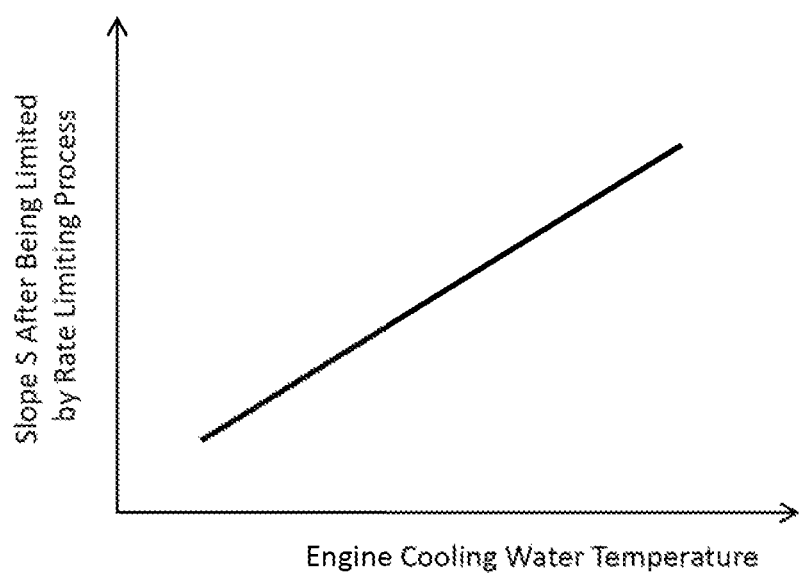
FIG. 8 is a graph showing a relationship between a slope S of a predicted waveform Wp2 after the limitation by the rate limiting process and the engine cooling water temperature.

In addition, the slope S of the predicted waveform Wp2 after the limitation by the rate limiting process may be a fixed value, but here, the slope S is calculated as follows. FIG. 8 is a graph showing a relationship between the slope S of the predicted waveform Wp2 after the limitation by the rate limiting process and the engine cooling water temperature. The maximum slope described above changes depending on, for example, the engine cooling water temperature. More specifically, the maximum slope becomes smaller (more gradual) when the engine cooling water temperature is lower. For this reason, as shown in FIG. 8, the rate limiting process may limit the slope S such that the slope S of the predicted waveform Wp2 becomes smaller when the engine cooling water temperature is lower. In detail, the control device 60 stores the relationship as shown in FIG. 8 in the memory 60b as a map, and calculates the slope S of the predicted waveform Wp2 depending on the engine cooling water temperature from this kind of map.

(First-Order Delay Process)

Next, FIG. 6C represents a waveform (predicted waveform Wp3) of the change portion of a predicted idle speed NEip3 obtained by performing the first-order delay process for the waveform of the target idle speed NEit. In the example shown in FIG. 6C, the first-order delay process is applied to the waveform (broken line) of the target idle speed NEit that is not accompanied by both the predicted rotational speed delay process and the rate limiting process.

The first-order delay process can be performed using, for example, the following Equation 2. Specifically, the predicted idle speed NEip3 after the first-order delay process at the current sample time k (i.e., the current value of the predicted idle speed NEip3) is referred to as NEip3 $(k)$. This current value NEip3 $(k)$ is obtained by adding the last value NEip3 $(k-1)$ of the predicted idle speed NEip3 to a value obtained by multiplying the difference between the current value NEit $(k)$ of the predicted idle speed NEit before the first-order delay process and the last value NEip3 $(k-1)$ of the predicted idle speed NEip3 by a designated time constant $\tau$. It should be noted that this time constant $\tau$ is determined in advance by conducting, for example, experiment as a value reflecting the response delay characteristics of the actual idle speed NEia.

$$NEip3(k)=(NEit(k)-NEip3(k-1))\times\tau+NEip3(k-1) \qquad (2)$$

Additionally, unlike the example shown in FIG. 6C, the "first-order delay process" according to the present disclosure may be applied to a waveform of the predicted idle speed change portion after both the predicted rotational speed delay process and the rate limiting process are applied, as in an example shown in FIG. 9 described below, or may be applied to a waveform of the predicted idle speed change portion after either the predicted rotational speed delay process or the rate limiting process is applied.

(Example of Rotation Prediction Process)

Figure 9:
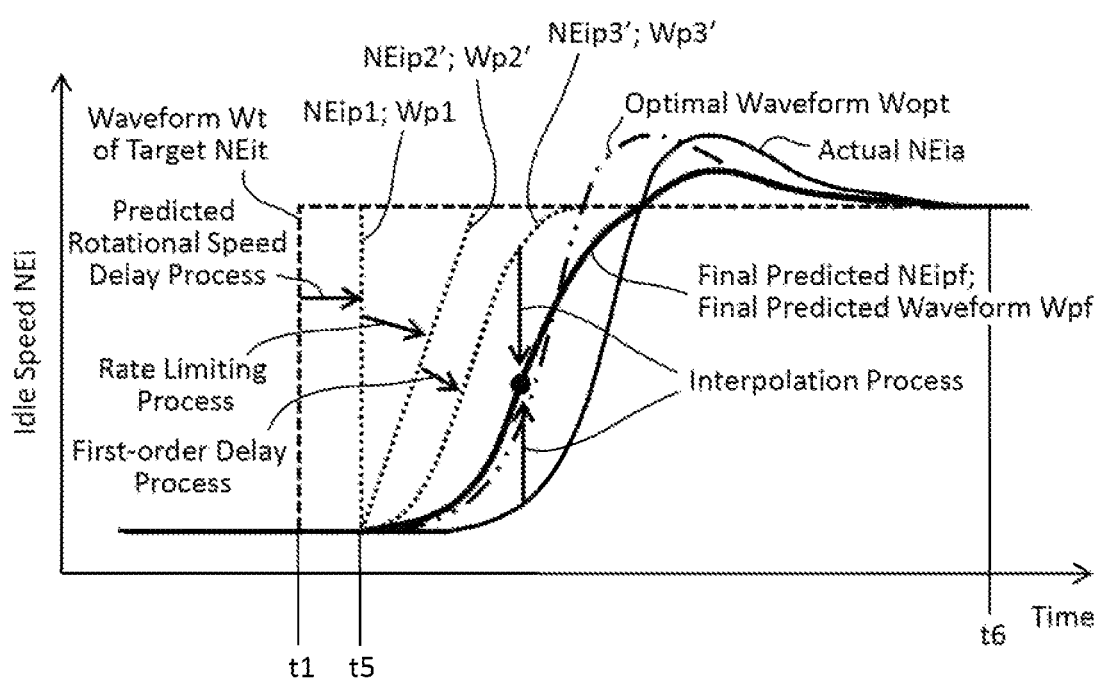
FIG. 9 is a time chart used to describe an example of the rotation prediction process executed in the embodiment of the present disclosure.

FIG. 9 is a time chart used to describe an example of the rotation prediction process executed in the embodiment. The rotation prediction process according to the present embodiment is executed by combining all of the predicted rotational speed delay process, the rate limiting process, and the first-order delay process that are described above. Moreover, the rotation prediction process according to the present embodiment is executed with the following "interpolation process".

Specifically, according to the rotation prediction process of the present embodiment, first, the predicted waveform Wp1 obtained by applying the predicted rotational speed delay process to the waveform Wt of the target idle speed NEit is calculated as shown in FIG. 9. Then, a predicted waveform Wp2' obtained by applying the rate limiting process to this predicted waveform Wp1 is calculated. Furthermore, a predicted waveform Wp3' obtained by applying the first-order delay process to this predicted waveform Wp2' is calculated. This calculation of the predicted waveform Wp3 can be performed in the same manner by replacing the current value NEit (k) of the target idle speed NEit before the first-order delay process in Equation 2 with the current value NEip2'(k) of the predicted idle speed NEip2' in the predicted waveform Wp2' after the rate limiting process.

(Interpolation Process)

Furthermore, in the rotation prediction process according to the present embodiment, the "interpolation process" is applied to the change portion of the predicted idle speed NEip3' after the first-order delay process that is calculated as described above. The predicted rotational speed delay process, the rate limiting process, and the first-order delay process described above are performed on the basis of the target idle speed NEit at the time point t1 at which the waveform of the target idle speed NEit is obtained. In contrast, the interpolation process is a process of calculating a final predicted idle speed NEipf by performing interpolation for each time step (control period), based on the change portion of the predicted idle speed NEip3' and the change portion of the actual idle speed NEia.

Specifically, according to the interpolation process, as an example, the following Equation 3 is used to calculate the current value NEipf (k) of the final predicted idle speed NEipf by performing interpolation based on the current value NEip3' (k) of the predicted idle speed NEip3' after the first-order delay process and the current value NEia (k) of the actual idle speed NEia. Then, for example, this kind of calculation of the interpolation process is repeatedly executed for each time step over a time period from a change start time point t5 of the predicted idle speed NEip3' to a change end time point t6 of the actual idle speed NEia.

$$NEipf(k)=(NEia(k)-NEip3'(k))\times K+NEip3'(k) \qquad (3)$$

The interpolation coefficient K in Equation 3 is adapted such that the predicted waveform Wpf, which is the waveform of the change portion of the final predicted idle speed NEipf, can be as close as possible to the optimal waveform Wopt by conducting, for example, experiments in advance.

FIG. 9 also represents the final predicted waveform Wpf after the interpolation process described above. From FIG. 9, it can be seen that the obtained predicted waveforms Wp1, Wp2', and Wp3' can be gradually brought closer to the optimal waveform Wopt by sequentially performing the predicted rotational speed delay process, the rate limiting process, and the first-order delay process. Then, it can be seen that, by further performing the above-described interpolation process, a predicted waveform Wpf that is even better closer to the optimal waveform Wopt can be obtained.

In addition, FIG. 9 represents a waveform of the actual idle speed NEia that changes with an overshoot with respect to the change in the target idle speed NEit. According to the interpolation process described above, the overshoot portion can also be expressed as in the predicted waveform Wpf shown in FIG. 9.

2-2-4. Rotational Speed Control Delay Process

In view of the second issue described above, according to the driving force change cancellation control of the present embodiment, when the brake response delay time tb is longer than the engine response delay time te, the control device 60 executes the following "rotational speed control delay process".

FIG. 10 is a time chart used to describe an outline of the rotational speed control delay process. FIG. 10 is associated with an example in which the brake response delay time tb is longer than the engine response delay time te, similarly to FIG. 5. In FIG. 10, a waveform of the change in a target idle speed NEit0 in response to the idle up request and a waveform of the change in the actual idle speed NEia associated with this change of the target idle speed NEit0 are represented by broken lines.

The rotational speed control delay process is a process of delaying the change time point of the target idle speed NEit with respect to the time point of the idle speed change request (in FIG. 10, time point t1) by a rotational speed control delay time tdlyc equal to or longer than a difference Δtbe (=tb−te) obtained by subtracting the engine response delay time te from the brake response delay time tb.

In the present embodiment, as an example, the rotational speed control delay time idlyc is set to be equal to the above described difference Δtbe. More specifically, in order to calculate the rotational speed control delay time tdlyc, for example, the engine response delay time te and the brake response delay time tb may be obtained in advance by, for example, conducting experiments, and then, the difference Δtbe between them may be stored in the memory 60b as a fixed value. Moreover, as already described, the engine response delay time te changes depending on, for example, the engine cooling water temperature, and the brake response delay time tb changes depending on, for example, the brake oil pressure or the brake oil temperature. Therefore, in order to calculate the rotational speed control delay time tdlyc, the difference Δtbe may be calculated onboard as a value according to, for example, the engine cooling water temperature when the driving force change cancellation control is executed.

In FIG. 10, a target idle speed NEitd, which is the target idle speed NEit after the rotational speed control delay process, is represented by a solid line. A time point 7 is the time point at which the target idle speed NEitd changes. The change in the actual idle speed NEiad associated with this change starts at a time point 18, which is delayed by the original engine response delay time te from the time point t7. Along with this, the change in the actual driving force Fda is also delayed by the rotational speed control delay time tdlyc from the change portion of the actual driving force Fda0 indicated by a broken line, as shown as the change portion of the actual driving force Fdad indicated by a solid line.

When the change time point t1 of the original target idle speed NEit0 (i.e., the time point of the idle speed change request) is used as a reference, the engine response delay time is increased from the original time te to the time te' that is from the time point t1 to the time point t8 due to the execution of the rotational speed control delay process. In other words, it can be said that the rotational speed control delay process corresponds to the process of delaying the start of the idle speed control by the rotational speed control delay time tdlyc, and as a consequence, apparently makes the engine response delay time variable.

The engine response delay time te' after the rotational speed control delay process using the rotational speed control delay time tdlyc that is set as described above becomes equal to the brake response delay time tb in the example shown in FIG. 10. Therefore, the rotation prediction process can be executed (started) at the change time point t1 of the original target idle speed NEit (i.e., at the time point of the idle speed change request).

In addition, even when the rotational speed control delay process is performed as in the example shown in FIG. 10, the predicted rotational speed delay process, the rate limiting process, and the first-order delay process that are included in the rotation prediction process are executed based on the original target idle speed NEit0 (i.e., target idle speed before the rotational speed control delay process) indicated by the broken line. Also, the interpolation by the interpolation process is performed based on the change portion of the predicted idle speed (not shown) after the first-order delay process and the change portion of the actual idle speed NEia0 indicated by the broken line. FIG. 10 represents the waveform (predicted waveform Wpf) of the change portion of the final predicted idle speed NEipf after the interpolation process. Moreover, in the example shown in FIG. 10, since the engine response delay time te' after the rotational speed control delay process is equal to the brake response delay time tb, the predicted rotational speed delay time tdlyp used in the predicted rotational speed delay process becomes zero.

Furthermore, even when the rotational speed control delay process is performed, the change portion of the predicted driving force Fdp according to the change portion of the predicted idle speed NEip is calculated as shown in FIG. 10 as a result of execution of the driving force prediction process. Then, as a result of execution of the braking force control process, the change portion of the braking force Fb for canceling the change portion of the calculated predicted driving force Fdp is calculated as the change portion of the target braking force Fbt, and is instructed to the brake device 30. In addition, the calculation and instruction of the change portion of the target braking force Fbt are started immediately from the time point t1 in conjunction with the start of the rotation prediction process at the time point t1.

As described so far, when the brake response delay time tb is longer than the engine response delay time te, the driving force change cancellation control is executed with the rotational speed control delay process. Therefore, similarly to the example in which the brake response delay time tb is equal to or shorter than the engine response delay time te, the change portion of the actual braking force Fba based on the change portion of the predicted idle speed NEip by the rotation prediction process can be applied to the wheels 2 while the calculation of the change portion of the predicted idle speed NEip can be executed. As a result, the change portion of the actual driving force Fda can be properly cancelled.

2-3. Process by Control Device

Figure 11:
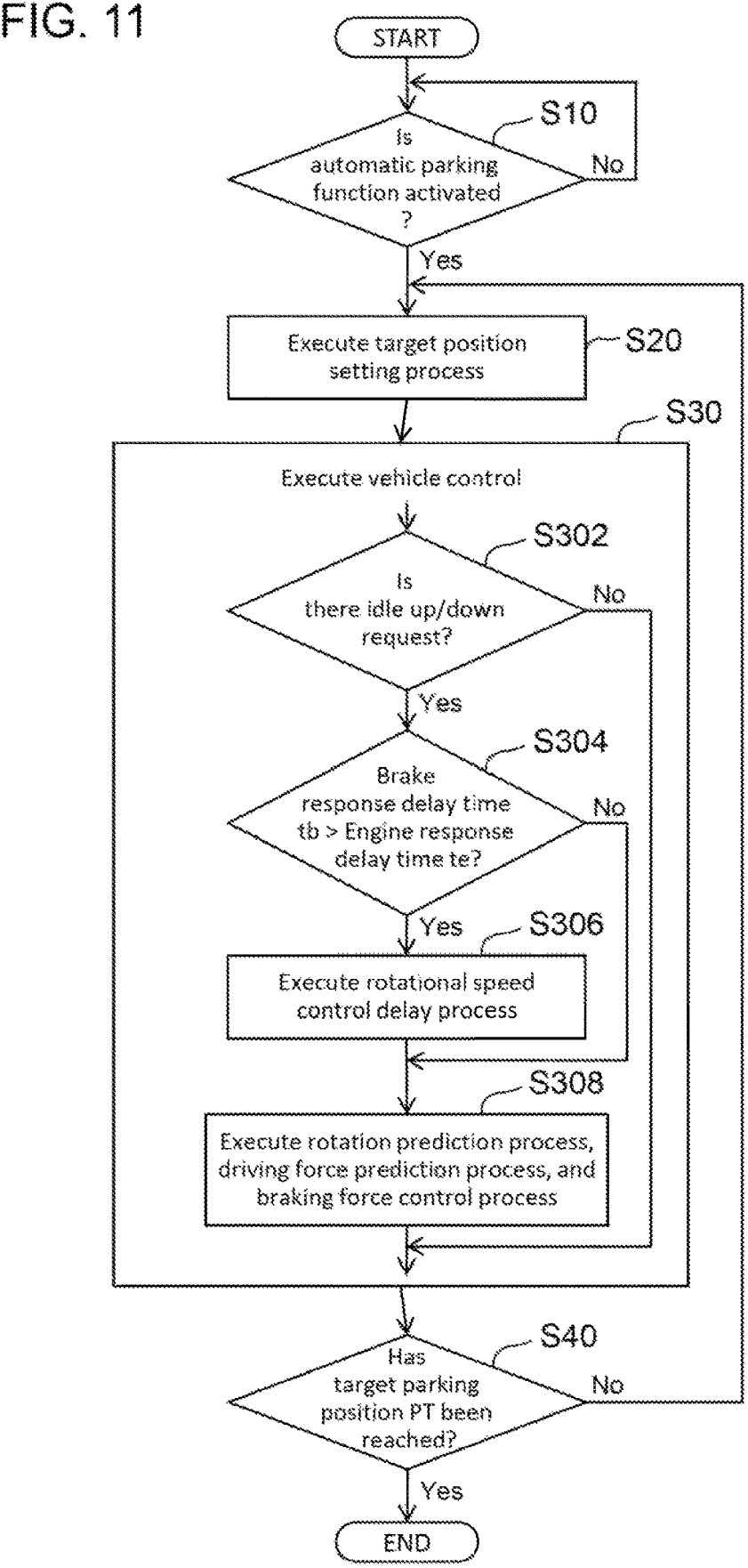
FIG. 11 is a flowchart showing a routine of processing related to the automatic parking control accompanied by the driving force change cancellation control according to the embodiment of the present disclosure.

FIG. 11 is a flowchart showing a routine of processing related to the automatic parking control accompanied by the driving force change cancellation control according to the embodiment.

In the routine shown in FIG. 11, first, in step S10, the control device 60 determines whether the automatic parking function is activated. An automatic parking switch for turning on/off the automatic parking function is included in the HMI unit 50. The operator can activate (turn on) the automatic parking function by operating the automatic parking switch. If the control device 60 determines that the automatic parking function is activated, the control device 60 starts the automatic parking control, and proceeds to step S20.

In step S20, the control device 60 executes the target position setting process of setting the target parking position PT. The target position setting process can be performed, for example, as follows based on the detection information received from the sensors 40. That is, the sensors 40 include a camera for imaging the surroundings of the vehicle 1. The parking space surrounded by, for example, white lines can be recognized by performing image analysis on the imaging information captured by the camera. The control device 60 automatically sets the target parking position PT in consideration of, for example, the recognized parking space and the size of the vehicle 1. The control device 60 may display the recognized parking space and the set target parking position PT on the display device of the HMI unit 50. The operator can confirm the parking space and the target parking position PT displayed on the display device. When the setting of the target parking position PT is completed, the control device 60 proceeds to step S30.

In step S30, the control device 60 executes the vehicle speed control described above to move the vehicle 1 to the target parking position PT. This step S30 is configured by the processes of steps S302 to S308. In step S302, the control device 60 determines whether or not there is an idle up/down request (idle speed change request) during the execution of this vehicle speed control. As a result, when there is an idle up/down request, the control device 60 executes the processes of steps S304 to S308 relating to the driving force change cancellation control until the change in the actual driving force Fda in response to the idle up/down request subsides. If, on the other hand, there is no idle up/down request, the control device 60 skips steps S304 to S308 and proceeds to step S40.

During the vehicle running, whether the engine response delay time te or the brake response delay time tb is longer may change. This is because the engine response delay time te changes depending on, for example, the engine cooling water temperature, and the brake response delay time tb changes depending on, for example, the brake oil pressure and the brake oil temperature. Therefore, in step S304, the control device 6) determines whether or not the brake response delay time tb is longer than the engine response delay time te.

If, as a result, the brake response delay time tb is longer than the engine response delay time te, the control device 60 performs the rotational speed control delay process described above in step S306 and then proceeds to step S308. If, on the other hand, the brake response delay time tb is equal to or shorter than the engine response delay time te, the control device 60 skips step S306 and proceeds to step S308. That is, if the brake response delay time tb is equal to or shorter than the engine response delay time te, the rotational speed control delay process is not executed.

In step S308, the control device 60 executes the rotation prediction process, the driving force prediction process, and the braking force control process that are described above. When the drive force change cancellation control is completed (that is, when the change in the actual drive force Fda subsides), the control device 60 proceeds to step S40.

In step S40, the control device 60 determines whether or not the vehicle 1 has reached the target parking position PT. If, as a result, the vehicle 1 has not yet reached the target parking position PT, the control device 60 returns to step S30. If, on the other hand, the vehicle 1 has reached the target parking position PT, the control device 60 terminates the automatic parking control.

3. Effect

As described above, the rotation prediction process associated with the driving force change cancellation control according to the present embodiment includes the "predicted rotational speed delay process", the "rate limiting process", and the "first-order delay process". According to the predicted rotational speed delay process, the change start time point of the predicted idle speed NEip can be made to match (at least approach) the change start time point (in FIG. 6A, time point (4) of the optimal waveform Wopt. According to the rate limiting process, the slope of the waveform of the change portion of the predicted idle speed NEip can be appropriately limited in consideration of the response characteristics of the actual idle speed NEia of the internal combustion engine 22 to which the automatic parking control is applied. Furthermore, according to the first-order delay process, in the waveform of the change portion of the predicted idle speed NEip, the response characteristics of the actual idle speed NEia of the internal combustion engine 22 can be more faithfully expressed by using the first-order delay. Thus, according to the rotation prediction process of the present embodiment, it is possible to suitably increase the accuracy of the calculation (prediction) of the change portion of the predicted idle speed NEip, which is the basis of the calculation of the change portion of the target braking force Fbt for canceling the vehicle driving force change.

Also, the rotation prediction process according to the present embodiment includes the "interpolation process". According to the interpolation process, the change portion of the predicted idle speed NEip can be more accurately calculated while reflecting the characteristics of the waveform of the change portion of the actual idle speed NEia with respect to the waveform of the change portion of the predicted idle speed NEip based on the waveform of the target idle speed NEit. As a result, it becomes possible to more suitably improve the accuracy of the calculation (prediction) of the change portion of the predicted idle speed NEip.

Moreover, the predicted rotational speed delay time tdlyp used in the predicted rotational speed delay process is calculated so as to be longer when the engine cooling water temperature is lower. This allows the predicted rotational speed delay time tdlyp to be set more accurately in consideration of the change in the engine cooling water temperature. Similarly, the slope S of the waveform of the change portion of the predicted idle speed NEip (in FIG. 6B, NEip2) that is limited by the rate limiting process is calculated so as to be longer when the engine cooling water temperature is lower. As a result, it becomes possible to set the slope S more accurately in consideration of the change in the engine cooling water temperature.

Furthermore, the driving force change cancellation control according to the present embodiment includes the "rotational speed control delay process". Therefore, even when the brake response delay time tb is longer than the engine response delay time te, it becomes possible to perform the automatic parking control (driving force change cancellation control) with the prediction of the change portion of the idle speed (i.e., with the calculation of the predicted idle speed NEip). That is, the automatic parking control with the prediction of the idle speed change portion can be achieved regardless of whether the brake response delay time tb or the engine response delay time te is longer.

4. Another Setting Example of Rotational Speed Control Delay Time Tdlyc

In the embodiment described above, the rotational speed control delay time tdlyc is set to be equal to the difference Δtbe (=tb−te) (see FIG. 10). However, the rotational speed control delay time tdlyc may be set to be longer than the difference Δtbe (in other words, such that the engine response delay time te' after the rotational speed control delay process becomes longer than the brake response delay time tb) instead of this kind of example. By ensuring a long engine response delay time te' with a margin for the brake response delay time tb using this kind of setting, when calculating the change portion of the predicted idle speed NEip more accurately with the interpolation process described above, the degree of freedom of the calculation can be increased.

5. Other Examples of Rotation Prediction Process

In the embodiment described above, the rotation prediction process is executed by combining all of the predicted rotational speed delay process, the rate limiting process, and the first-order delay process, as well as the interpolation process. As a result, the change portion of the predicted idle speed NEip can be calculated (predicted) more accurately. However, the rotation prediction process according to the present disclosure may be executed without an interpolation process. Furthermore, the rotation prediction process may be executed with any one or two of the predicted rotational speed delay process, the rate limiting process, and the first-order delay process, or may be a combination of the interpolation process with one or two processes selected in this way.

The embodiments and modifications described above may be combined in other ways than those explicitly described above as required and may be modified in various ways without departing from the scope of the present disclosure.

What is claimed is:

1. An automatic parking control device applied to a vehicle that is equipped with a drive device and a brake device and is configured to execute an automatic parking control that automatically moves the vehicle to a target parking position, the drive device including an internal combustion engine and a torque converter and being configured to output a vehicle driving force transmitted to a wheel of the vehicle, the brake device being configured to generate a vehicle braking force applied to the wheel, the automatic parking control including a driving force change cancellation control that controls the brake device so as to generate the vehicle braking force that cancels a change in the vehicle driving force associated with a change in actual idle speed of the internal combustion engine when a target idle speed changes in response to an idle speed change request, the automatic parking control device comprising an electronic control unit configured, in the driving force change cancellation control, to:

execute a rotation prediction process to calculate a predicted idle speed change portion corresponding to a change portion of an idle speed obtained by advancing a change portion of the actual idle speed associated with a change in the target idle speed by a brake response delay time from a time point at which a target vehicle braking force is instructed to the brake device to a time point at which a change in the vehicle braking force starts;

execute a driving force prediction process to calculate a predicted driving force change portion corresponding to a change portion of the vehicle driving force according to the predicted idle speed change portion;

execute a braking force control process to calculate, as a change portion of the target vehicle braking force, a change portion of the vehicle braking force that cancels the predicted driving force change portion and instruct a calculated vehicle braking force change portion to the brake device; and when the brake response delay time is longer than an engine response delay time being a response delay time of the actual idle speed with respect to the change in the target idle speed, execute a rotational speed control delay process to delay the change in the target idle speed, by a rotational speed control delay time, from a time point at which the idle speed change request is issued, the rotational speed control delay time being longer than or equal to a difference obtained by subtracting the engine response delay time from the brake response delay time.

2. The automatic parking control device according to claim 1, wherein the rotation prediction process includes at least one of a predicted rotational speed delay process, a rate limiting process, and a first-order delay process to calculate a waveform of the predicted idle speed change portion based on a waveform of the target idle speed, the predicted rotational speed delay process delays a change start time point of the waveform of the predicted idle speed change portion so as to be delayed from a change start time point of the waveform of the target idle speed by a predicted rotational speed delay time corresponding to a difference obtained by subtracting the brake response delay time from the engine response delay time, the rate limiting process delays a slope of the waveform of the predicted idle speed change portion so as to be equal to or smaller than a maximum slope of the change in the actual idle speed that can be generated by the internal combustion engine, and the first-order delay process is applied to a waveform of the target idle speed without any of the predicted rotational speed delay process and the rate limiting process, or a waveform of the predicted idle speed change portion after at least one of the predicted rotational speed delay process and the rate limiting process.

3. The automatic parking control device according to claim 2, wherein the rotation prediction process includes all of the predicted rotational speed delay process, the rate limiting process, and the first-order delay process.

4. The automatic parking control device according to claim 2, wherein the rotation prediction process includes an interpolation process to calculate a final predicted idle speed change portion by interpolation for each time step based on the predicted idle speed change portion after at least one of the predicted rotational speed delay process, the rate limiting process, and the first-order delay process, and the change portion of the actual idle speed associated with the change in the target idle speed.

5. The automatic parking control device according to claim 2, wherein the predicted rotational speed delay time is longer when cooling water temperature of the internal combustion engine is lower.

6. The automatic parking control device according to claim 2, wherein the slope of the waveform of the predicted idle speed change portion after being limited by the rate limiting process is smaller when cooling water temperature of the internal combustion engine is lower.

7. An automatic parking control device applied to a vehicle that is equipped with a drive device and a brake device and is configured to execute an automatic parking control that automatically moves the vehicle to a target parking position, the drive device including an internal combustion engine and a torque converter and being configured to output a vehicle driving force transmitted to a wheel of the vehicle, the brake device being configured to generate a vehicle braking force applied to the wheel, the automatic parking control including a driving force change cancellation control that controls the brake device so as to generate the vehicle braking force that cancels a change in the vehicle driving force associated with a change in actual idle speed of the internal combustion engine when a target idle speed changes in response to an idle speed change request, the automatic parking control device comprising an electronic control unit configured, in the driving force change cancellation control, to:

execute a rotation prediction process to calculate a predicted idle speed change portion corresponding to a change portion of an idle speed obtained by advancing a change portion of the actual idle speed associated with a change in the target idle speed by a brake response delay time from a time point at which a target vehicle braking force is instructed to the brake device to a time point at which a change in the vehicle braking force starts;

execute a driving force prediction process to calculate a predicted driving force change portion corresponding to a change portion of the vehicle driving force according to the predicted idle speed change portion; and execute a braking force control process to calculate, as a change portion of the target vehicle braking force, a change portion of the vehicle braking force that cancels the predicted driving force change portion and instruct a calculated vehicle braking force change portion to the brake device, wherein the rotation prediction process includes at least one of a predicted rotational speed delay process, a rate limiting process, and a first-order delay process to calculate a waveform of the predicted idle speed change portion based on a waveform of the target idle speed, the predicted rotational speed delay process delays a change start time point of the waveform of the predicted idle speed change portion so as to be delayed from a change start time point of the waveform of the target idle speed by a predicted rotational speed delay time corresponding to a difference obtained by subtracting the brake response delay time from an engine response delay time being a response delay time of the actual idle speed with respect to the change in the target idle speed, the rate limiting process delays a slope of the waveform of the predicted idle speed change portion so as to be equal to or smaller than a maximum slope of the change in the actual idle speed that can be generated by the internal combustion engine, and the first-order delay process is applied to a waveform of the target idle speed without any of the predicted rotational speed delay process and the rate limiting process, or a waveform of the predicted idle speed change portion after at least one of the predicted rotational speed delay process and the rate limiting process.

8. The automatic parking control device according to claim 7, wherein
the rotation prediction process includes all of the predicted rotational speed delay process, the rate limiting process, and the first-order delay process.

9. The automatic parking control device according to claim 7, wherein
the rotation prediction process includes an interpolation process to calculate a final predicted idle speed change portion by interpolation for each time step based on the predicted idle speed change portion after at least one of the predicted rotational speed delay process, the rate limiting process, and the first-order delay process, and the change portion of the actual idle speed associated with the change in the target idle speed.

10. The automatic parking control device according to claim 7, wherein
the predicted rotational speed delay time is longer when cooling water temperature of the internal combustion engine is lower.

11. The automatic parking control device according to claim 7, wherein
the slope of the waveform of the predicted idle speed change portion after being limited by the rate limiting process is smaller when cooling water temperature of the internal combustion engine is lower.

* * * * *